United States Patent
Shah et al.

(10) Patent No.: US 10,223,578 B2
(45) Date of Patent: Mar. 5, 2019

(54) SYSTEM AND METHOD FOR UTILIZING FACIAL RECOGNITION TECHNOLOGY FOR IDENTIFYING AN UNKNOWN INDIVIDUAL FROM A DIGITAL IMAGE

(71) Applicant: AVIGILON PATENT HOLDING 1 CORPORATION, Vancouver (CA)

(72) Inventors: Alex Shah, San Diego, CA (US); Charles A. Myers, La Jolla, CA (US)

(73) Assignee: AVIGILON PATENT HOLDING CORPORATION, Vancouver (CA)

( * ) Notice: Subject to any disclaimer, the term of this patent is extended or adjusted under 35 U.S.C. 154(b) by 3 days.

(21) Appl. No.: 14/020,809

(22) Filed: Sep. 7, 2013

(65) Prior Publication Data

US 2014/0079298 A1    Mar. 20, 2014

Related U.S. Application Data

(63) Continuation of application No. 12/341,318, filed on Dec. 22, 2008, now Pat. No. 8,369,570, and a continuation of application No. 12/142,732, filed on Jun. 19, 2008, which is a continuation-in-part of application No. 11/534,667, filed on Sep. 24, 2006, now Pat. No. 7,450,740.

(Continued)

(51) Int. Cl.
*G06K 9/00*    (2006.01)

(52) U.S. Cl.
CPC ..... *G06K 9/00288* (2013.01); *G06K 9/00221* (2013.01); *G06K 9/00281* (2013.01); *G06K 9/00979* (2013.01)

(58) Field of Classification Search
None
See application file for complete search history.

(56) References Cited

U.S. PATENT DOCUMENTS

| | | | |
|---|---|---|---|
| 3,805,238 A | 4/1974 | Rothfjell | |
| 4,020,463 A | 4/1977 | Himmel | |

(Continued)

FOREIGN PATENT DOCUMENTS

| | | | |
|---|---|---|---|
| WO | WO2005091211 | | 9/2005 |
| WO | WO2006053375 | | 5/2006 |
| WO | WO 2007097144 | * | 1/2007 |

OTHER PUBLICATIONS

Complaint, *FaceDouble, Inc.* vs. *VIZI Labs, Inc.*, Case No. '12CV1584WQHMDD, Filed Jun. 26, 2012.

(Continued)

*Primary Examiner* — Tahmina Ansari
(74) *Attorney, Agent, or Firm* — Baker & Hostetler LLP

(57) ABSTRACT

A method and system for of identifying an unknown individual from a digital image is disclosed herein. In one embodiment, the present invention allows an individual to photograph a facial image an unknown individual, transfer that facial image to a server for processing into a feature vector, and then search social networking Web sites to obtain information on the unknown individual. The Web sites comprise myspace.com, facebook.com, linkedin.com, www.hi5.com, www.bebo.com, www.friendster.com, www.igoogle.com, netlog.com, and orkut.com. A method of networking is also disclosed. A method for determining unwanted individuals on a social networking website is also disclosed.

16 Claims, 9 Drawing Sheets

Related U.S. Application Data

(60) Provisional application No. 60/721,226, filed on Sep. 28, 2005, provisional application No. 60/945,099, filed on Jun. 20, 2007.

(56) References Cited

U.S. PATENT DOCUMENTS

| | | | |
|---|---|---|---|
| 4,712,103 A | 12/1987 | Gotanda | |
| 4,858,000 A | 8/1989 | Lu | |
| 4,975,969 A | 12/1990 | Tal | |
| 5,031,228 A | 7/1991 | Lu | |
| 5,063,603 A | 11/1991 | Burt | |
| 5,164,992 A | 11/1992 | Turk et al. | |
| 5,386,103 A | 1/1995 | Deban et al. | |
| 5,432,864 A | 11/1995 | Lu et al. | |
| 6,035,055 A | 3/2000 | Wang et al. | |
| 6,072,894 A | 6/2000 | Payne | |
| 6,108,437 A | 8/2000 | Lin | |
| 6,111,517 A | 8/2000 | Atick et al. | |
| 6,134,044 A | 10/2000 | Gdovin et al. | |
| 6,173,068 B1* | 1/2001 | Prokoski | 382/115 |
| 6,292,575 B1 | 9/2001 | Bortolussi et al. | |
| 6,345,275 B2 | 2/2002 | Lee | |
| 6,430,306 B2 | 8/2002 | Solcum et al. | |
| 6,675,145 B1 | 1/2004 | Yehia et al. | |
| 6,765,470 B2 | 7/2004 | Shinzaki | |
| 6,792,401 B1 | 9/2004 | Nigro et al. | |
| 6,882,741 B2 | 4/2005 | Dobashi et al. | |
| 6,919,892 B1 | 7/2005 | Cheiky et al. | |
| 6,940,545 B1* | 9/2005 | Ray et al. | 348/222.1 |
| 6,961,466 B2 | 11/2005 | Imagawa et al. | |
| 6,970,580 B2 | 11/2005 | Kies | |
| 6,976,629 B2 | 12/2005 | Carlson | |
| 7,039,221 B1 | 5/2006 | Tumey et al. | |
| 7,050,635 B2 | 5/2006 | Javidi et al. | |
| 7,095,879 B2 | 8/2006 | Yan et al. | |
| 7,123,754 B2 | 10/2006 | Matsuo et al. | |
| 7,123,783 B2 | 10/2006 | Gargesha et al. | |
| 7,124,066 B2 | 10/2006 | Marschner et al. | |
| 7,127,086 B2 | 10/2006 | Yuasa et al. | |
| 7,127,087 B2 | 10/2006 | Huang et al. | |
| 7,130,454 B1 | 10/2006 | Berube et al. | |
| 7,221,931 B2 | 5/2007 | Benco et al. | |
| 7,369,685 B2 | 5/2008 | DeLean | |
| 7,428,321 B1 | 9/2008 | Shah et al. | |
| 7,450,740 B2 | 11/2008 | Shah et al. | |
| 7,519,200 B2 | 4/2009 | Gokturk et al. | |
| 7,529,411 B2 | 5/2009 | Haupt et al. | |
| 7,551,755 B1 | 6/2009 | Steinberg et al. | |
| 7,564,994 B1 | 7/2009 | Steinberg et al. | |
| 7,565,139 B2 | 7/2009 | Neven, Sr. et al. | |
| 7,587,070 B2 | 9/2009 | Myers et al. | |
| 7,599,527 B2 | 10/2009 | Shah et al. | |
| 7,668,348 B2 | 2/2010 | Shah et al. | |
| 7,751,805 B2 | 7/2010 | Neven et al. | |
| 7,760,917 B2 | 7/2010 | Vanhoucke et al. | |
| 7,783,085 B2 | 8/2010 | Perlmutter et al. | |
| 7,831,069 B2 | 11/2010 | Shah et al. | |
| 7,859,543 B2* | 12/2010 | Salvador | 345/581 |
| 7,860,320 B2* | 12/2010 | Luo et al. | 382/227 |
| 7,885,435 B2 | 2/2011 | Shah et al. | |
| 7,907,755 B1* | 3/2011 | Perlmutter et al. | 382/118 |
| 7,962,128 B2 | 6/2011 | Neven et al. | |
| 8,199,980 B2 | 6/2012 | Shah et al. | |
| 8,311,289 B2 | 11/2012 | Vanhoucke et al. | |
| 8,311,294 B2 | 11/2012 | Myers et al. | |
| 8,341,412 B2 | 12/2012 | Conwell | |
| 8,369,570 B2 | 2/2013 | Myers et al. | |
| 8,421,872 B2 | 4/2013 | Neven, Sr. | |
| 8,600,174 B2 | 12/2013 | Shah et al. | |
| 8,798,321 B2 | 8/2014 | Myers et al. | |
| 8,897,506 B2 | 11/2014 | Myers et al. | |
| 8,908,933 B2 | 12/2014 | Shah et al. | |
| 9,224,035 B2 | 12/2015 | Myers et al. | |
| 9,412,009 B2 | 8/2016 | Myers et al. | |
| 9,465,817 B2 | 10/2016 | Shah et al. | |
| 9,569,659 B2 | 2/2017 | Myers et al. | |
| 9,875,395 B2 | 1/2018 | Myers et al. | |
| 2002/0118195 A1 | 8/2002 | Paetzold et al. | |
| 2003/0034978 A1 | 2/2003 | Buddemeier et al. | |
| 2003/0039380 A1 | 2/2003 | Sukegawa et al. | |
| 2004/0151349 A1 | 8/2004 | Milne et al. | |
| 2004/0156535 A1* | 8/2004 | Goldberg et al. | 382/115 |
| 2004/0240711 A1 | 12/2004 | Hamza et al. | |
| 2005/0043897 A1 | 2/2005 | Meyer | |
| 2005/0058320 A1 | 3/2005 | Rhoads et al. | |
| 2005/0076004 A1 | 4/2005 | Yanagisawa et al. | |
| 2005/0084154 A1 | 4/2005 | Li et al. | |
| 2005/0182729 A1 | 4/2005 | Kananen | |
| 2005/0097131 A1 | 5/2005 | Benco et al. | |
| 2005/0162523 A1 | 7/2005 | Darrell et al. | |
| 2005/0185060 A1 | 8/2005 | Neven, Sr. | |
| 2005/0212913 A1* | 9/2005 | Richter | 348/170 |
| 2005/0275506 A1 | 12/2005 | Otsuka | |
| 2006/0012677 A1 | 1/2006 | Neven, Sr. et al. | |
| 2006/0018522 A1 | 1/2006 | Sunzeri et al. | |
| 2006/0050933 A1 | 3/2006 | Adam et al. | |
| 2006/0110029 A1 | 5/2006 | Kazui et al. | |
| 2006/0120571 A1 | 6/2006 | Tu et al. | |
| 2006/0251292 A1* | 11/2006 | Gokturk et al. | 382/103 |
| 2007/0071290 A1* | 3/2007 | Shah et al. | 382/118 |
| 2008/0005771 A1* | 1/2008 | Salvador | 725/105 |
| 2008/0273761 A1* | 11/2008 | Kawata | 382/115 |
| 2009/0034805 A1* | 2/2009 | Perlmutter et al. | 382/118 |
| 2009/0060289 A1* | 3/2009 | Shah et al. | 382/118 |
| 2009/0060293 A1* | 3/2009 | Nagao et al. | 382/118 |
| 2009/0074259 A1 | 3/2009 | Baltatu et al. | |
| 2010/0235400 A1* | 9/2010 | Myers et al. | 707/802 |
| 2011/0182485 A1 | 7/2011 | Shochat et al. | |
| 2013/0070976 A1 | 3/2013 | Myers et al. | |
| 2013/0142402 A1 | 6/2013 | Myers et al. | |
| 2014/0007154 A1* | 1/2014 | Seibold et al. | 725/25 |
| 2014/0079298 A1* | 3/2014 | Shah et al. | 382/118 |

OTHER PUBLICATIONS

*FaceDouble, Inc.* vs. *VIZI Labs, Inc.*, Case No. '12CV1584WQHMDD, Defendant Face.Com's Preliminary Claim Construction and Identification of Extrinsic Evidence Pursuant to Patent L.R. 4.1(a)-(B), dated Jan. 13, 2014.

*FaceDouble, Inc.* vs. *VIZI Labs, Inc.*, Case No. '12CV1584WQHMDD, First Amended Complaint for Patent Infringement and Demand for Jury Trial, dated May 14, 2013.

*FaceDouble, Inc.* vs. *VIZI Labs, Inc.*, Case No. '12CV1584WQHMDD, FaceDouble's Initial Disclosure of Asserted Claims and Infringement Contentions Under Local Patent Rule 3.1, dated Nov. 22, 2013.

*FaceDouble, Inc.* vs. *VIZI Labs, Inc.*, Case No. '12CV1584WQHMDD, FaceDouble's Responses to Face.Com's First Set of Interrogatories, Filed Dec. 20, 2013.

*FaceDouble, Inc.* vs. *VIZI Labs, Inc.*, Case No. '12CV1584WQHMDD, FaceDouble's Amended Initial Disclosure of Asserted Claims and Infringement Contentions Under Local Patent Rule 3.1, dated Nov. 22, 2013.

*FaceDouble, Inc.* vs. *VIZI Labs, Inc.*, Case No. '12CV1584WQHMDD, Plaintiff FaceDouble's Preliminary Proposed Construction of Claim Terms Pursuant to Patent Local Rule 4.1, dated Jan. 13, 2014.

*FaceDouble, Inc.* vs. *VIZI Labs, Inc.*, Case No. '12CV1584WQHMDD, Joint Claim Construction Chart, dated Feb. 13, 2014.

*FaceDouble, Inc.* vs. *VIZI Labs, Inc.*, Case No. '12CV1584WQHMDD, Joint Claim Construction Worksheet, dated Feb. 13, 2014.

*FaceDouble, Inc.* vs. *VIZI Labs*, Inc., Case No. '12CV1584WQHMDD, Joint Hearing Statement, dated Feb. 13, 2014.

*FaceDouble, Inc.* vs. *VIZI Labs, Inc.*, Case No. '12CV1584WQHMDD, Defendant Face.com's Invalidity Contentions, Dated Jan. 2, 2014.

*FaceDouble, Inc.* vs. *VIZI Labs, Inc.*, Case No. '12CV1584WQHMDD, Invalidity Contentions—'070 Invalidity Chart Exhibit A1-A3, Dated Jan. 2, 2014.

*FaceDouble, Inc.* vs. *VIZI Labs, Inc.*, Case No. '12CV1584WQHMDD, Invalidity Contentions—'070 Invalidity Chart Exhibit A4-A7, Dated Jan. 2, 2014.

(56) References Cited

OTHER PUBLICATIONS

*FaceDouble, Inc.* vs. *VIZI Labs, Inc.*, Case No. '12CV1584WQHMDD, Invalidity Contentions—'070 Invalidity Chart Exhibit A8-A12, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A13-A20, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A21-A24, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A25-A26, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A27, Dated Jan. 2, 2014.
*FaceDouble, Inc.* vs. *VIZI Labs, Inc.*, Case No. '12CV1584WQHMDD, Invalidity Contentions—'070 Invalidity Chart Exhibit A28-A29, Dated Jan. 2, 2014.
Newsam et al., Category-Based Image Retrieval, 2001, IEEE, pp. 596-599.
Zhang et al., Relevance Feedback and Learning in Content-Based Image Search, 2003, World Wide Web: Internet and Web Information Systems, 6, 131-155, The Netherlands.
Zhang et al., Relevance Feedback and Learning in Content-Based Image Search, Microsoft Research, China.
*Facedouble, Inc. v. Face.com*, Case No. 3:12-CV-01584-DMS-MDD, Facedouble's Supplemental Response to Face.com's Interrogatory 2, Feb. 25, 2014.
*Facedouble, Inc. v. Face.com*, Case No. 3:12-CV-01584-DMS-MDD, Defendant Face.com's Amended Invalidity Contentions, Feb. 25, 2014.
*FaceDouble, Inc.* vs. *VIZI Labs, Inc.*, Case No. '12CV1584WQHMDD, Defendant Face.Com's Preliminary Claim Constructions and Identification of Extrinsic Evidence Pursuant to Patent L.R. 4.1(A)-(B).
*FaceDouble, Inc.* vs. *VIZI Labs, Inc.*, Case No. '12CV1584WQHMDD, First Amended Complaint for Patent and Demand for Jury Trial Infringement.
*FaceDouble, Inc.* vs. *VIZI Labs, Inc.*, Case No. '12CV1584WQHMDD, FaceDouble's Initial Disclosure of Asserted Claims and Infringement Contentions Under Local Patent Rule 3.1.
*FaceDouble, Inc.* vs. *VIZI Labs, Inc.*, Case No. '12CV1584WQHMDD, FaceDouble's Responses to Face.Com's First Set of Interrogatories.
*FaceDouble, Inc.* vs. *VIZI Labs, Inc.*, Case No. '12CV1584WQHMDD,FaceDouble's Amended Initial Disclosure of Asserted Claims and Infringement Contentions Under Local Patent Rule 3.1.
*FaceDouble, Inc.* vs. *VIZI Labs, Inc.*, Case No. '12CV1584WQHMDD, Plaintiff FaceDouble's Preliminary Proposed Construction of Claim Terms Pursuant to Patent Local Rule 4.1.
*FaceDouble, Inc.* vs. *VIZI Labs, Inc.*, Case No. '12CV1584WQHMDD, Joint Claim Construction Chart.
*FaceDouble, Inc.* vs. *VIZI Labs, Inc.*, Case No. '12CV1584WQHMDD, Joint Claim Construction Worksheet.
*FaceDouble, Inc.* vs. *VIZI Labs, Inc.*, Case No. '12CV1584WQHMDD, Joint Hearing Statement.
Complaint, *FaceDouble v. Coca Cola*, case No. 10-cv-0485 IEG RBB.
Plaintiff's Answer to Defendant Crispin's Counterclaim, *FaceDouble v. Coca Cola*, case No. 10-cv-0485 IEG RBB.
Plaintiff's Answer to Defendant Coca-Cola's Counterclaim, *FaceDouble v. Coca Cola*, case No. 10-cv-0485 IEG RBB.
Plaintiff's Response to Motion to Continue Preliminary Injunction, *FaceDouble v. Coca Cola*, case No. 10-cv-0485 IEG RBB.
Defendants' Memorandum in Support of Motion to Continue Preliminary Injunction, *FaceDouble v. Coca Cola*, case No. 10-cv-0485 IEG RBB.
Plaintiff's Motion for Preliminary Injunction, *FaceDouble v. Coca Cola*, case No. 10-cv-0485 IEG RBB.
Defendant Crispin's Answer, Affirmative Defenses and Counterclaims, *FaceDouble v. Coca Cola*, case No. 10-cv-0485 IEG RBB.
Defendant Coca-Cola's Answer and Counterclaims, *FaceDouble v. Coca Cola*, case No. 10-cv-0485 IEG RBB.
Defendant's Opposition to the Motion for Preliminary Injunction, *FaceDouble v. Coca Cola*, case No. 10-cv-0485 IEG RBB.
Final Office Action for U.S. Appl. No. 13/252,139, dated Mar. 22, 2013.
Adler, Automatic Face Recognition System Architecture for Collaborative Virtual Environments, 07-7803-7635-8/02 IEEE, 2002, pp. 1-6.
Al-Baker et al., A GPRS-Based Remote Human Face Identification System for Handheld Devices, 0-7803-9019-9/05, IEEE 2005.
Meng et al., A Highg Performance Face Recognition System Based on a Huge Face Database, 0-7803-9091-01/05, IEEE 2005, pp. 5159-5164.
Adler, Can Images be regenerated From Biometric Templates, Biometrics Conference, Sep. 22-24, 2003.
Wang et al., Application of the fuzzy logic in content-based image retrieval, Journal of Computer Science & Technology, Apr. 1, 2005.
Zhang et al., Automated Annotation of Human Faces in Family Albums, MM'03, Nov. 2-8, 2003, pp. 355-358, Berkeley, California, pp. 355-358.
Celebi et al., Content-Based Image Retrieval Incorporating Models of Human Perception, Proceedings of the International Conference on Information Technology: Coding and Computing, 07695-2108-08/04, IEEE 2004.
Uchihashi et al., Content-Free Image Retrieval Based on Relations Exploited From user Feedbacks, 0-7803-9332-5/05, IEEE 2005.
Aslandogan et al., Evaluating Strategies and Systems for Content Based Indexing of Person Images on the Web, ACM Multimedia 2000, Los Angeles, California, 2000, pp. 313-321.
Weinstein et al., Handheld Face Identification Technology in a Pervasive Computing Environment, Pervasive 2002, Zurich, Switzerland, 2002.
Wood et al., Iterative Refinement by Relevance Feedback in Content Based Digital Image Retrieval, ACM Multimedia'98, Bristol United Kingdom, 1998, pp. 13-20.
Girgensohn et al., Leveraging Face Recognition Technology to Find and Organize Photos, MIR'04, Oct. 15-16, 2004, New York, New York, 2004, pp. 99-106.
Song et al., Online Face Recognition System Through the Internet, 0-7803-8603-5/04 , IEEE, 2004, pp. 1207-1210.
Cox et al., Bayesian Relevance Feedback for Image Retrieval, Forum on research and Technology Advances in Digital Libraries, ADL'96, 1996.
*FaceDouble, Inc. vs. VIZI Labs, Inc.*, Case No. '12CV1584WQHMDD, Defendant Face.com's Invalidity Contentions Filed Jun. 26, 2012.
*FaceDouble, Inc. vs. VIZI Labs, Inc.*, Case No. '12CV1584WQHMDD, Invalidity Contentions—'070 Invalidity Chart Exhibit A1-A3.
*FaceDouble, Inc. vs. VIZI Labs, Inc.*, Case No. '12CV1584WQHMDD, Invalidity Contentions—'070 Invalidity Chart Exhibit A4-A7.
*FaceDouble, Inc. vs. VIZI Labs, Inc.*, Case No. '12CV1584WQHMDD, Invalidity Contentions—'070 Invalidity Chart Exhibit A8-A12.
*FaceDouble, Inc. vs. VIZI Labs, Inc.*, Case No. '12CV1584WQHMDD, Invalidity Contentions—'070 Invalidity Chart Exhibit A13-A20.
*FaceDouble, Inc. vs. VIZI Labs, Inc.*, Case No. '12CV1584WQHMDD, Invalidity Contentions—'070 Invalidity Chart Exhibit A21-A24.
*FaceDouble, Inc. vs. VIZI Labs, Inc.*, Case No. '12CV1584WQHMDD, Invalidity Contentions—'070 Invalidity Chart Exhibit A25-A26.
*FaceDouble, Inc. vs. VIZI Labs, Inc.*, Case No. '12CV1584WQHMDD, Invalidity Contentions—'070 Invalidity Chart Exhibit A27.
*FaceDouble, Inc. vs. VIZI Labs, Inc.*, Case No. '12CV1584WQHMDD, Invalidity Contentions—'070 Invalidity Chart Exhibit A28-A29.

\* cited by examiner

700 →

Jessica's Social Network Web Page

Photo of Jessica

Photo of Friends

Likes and Dislikes
Jazz      Rock
Dogs      Cats
Veggies   Meat

Personal information
Age: 28
Weight: 90 lbs
Employer: State

SYSTEM AND METHOD FOR UTILIZING FACIAL RECOGNITION TECHNOLOGY FOR IDENTIFYING AN UNKNOWN INDIVIDUAL FROM A DIGITAL IMAGE

CROSS REFERENCE TO RELATED APPLICATION

The Present Application is a continuation-in-part application of U.S. patent application Ser. No. 13/753,543, filed on Jan. 30, 2013, now U.S. Pat. No. 8,798,321, issued on Aug. 5, 2014, which is a continuation application of U.S. patent application Ser. No. 12/341,318, filed on Dec. 22, 2008, now U.S. Pat. No. 8,369,570, issued on Feb. 5, 2013, which claims priority to U.S. Provisional Patent No. 61/016,800, filed on Dec. 26, 2007, and is a continuation-in-part application of U.S. patent application Ser. No. 12/142,732, filed on Jun. 19, 2008, now abandoned, which claims priority to U.S. Provisional Patent No. 60/945,099, filed Jun. 20, 2007, and is a continuation-in-part application of U.S. patent application Ser. No. 11/534,667, filed on Sep. 24, 2006, now U.S. Pat. No. 7,450,740, issued on Nov. 11, 2008, which claims priority to U.S. Provisional Patent Application No. 60/721,226, filed Sep. 28, 2005.

STATEMENT REGARDING FEDERALLY SPONSORED RESEARCH OR DEVELOPMENT

Not Applicable

BACKGROUND OF THE INVENTION

Field of the Invention

The present invention relates to a method and system for classification of digital facial images received over wireless digital networks or the Internet and retrieval of information associated with a classified image.

Description of the Related Art

Classification of facial images using feature recognition software is currently used by various government agencies such as the Department of Homeland Security (DHS) and the Department of Motor Vehicles (DMV) for detecting terrorists, detecting suspected cases of identity fraud, automating border and passport control, and correcting mistakes in their respective facial image databases. Facial images stored in the DMV or DHS are digitized and stored in centralized databases, along with associated information on the person. Examples of companies that provide biometric facial recognition software include Cross Match Technologies, Cognitec, Cogent Systems, and Iridian Technologies; of these, Cognitec also provides a kiosk for digitally capturing images of people for storage into their software.

Your face is an important part of who you are and how people identify you. Imagine how hard it would be to recognize an individual if all faces looked the same. Except in the case of identical twins, the face is arguably a person's most unique physical characteristic. While humans have had the innate ability to recognize and distinguish different faces for millions of years, computers are just now catching up.

Visionics, a company based in New Jersey, is one of many developers of facial recognition technology. The twist to its particular software, FACEIT, is that it can pick someone's face out of a crowd, extract that face from the rest of the scene and compare it to a database full of stored images. In order for this software to work, it has to know what a basic face looks like. Facial recognition software is based on the ability to first recognize faces, which is a technological feat in itself, and then measure the various features of each face.

If you look in the mirror, you can see that your face has certain distinguishable landmarks. These are the peaks and valleys that make up the different facial features. Visionics defines these landmarks as nodal points. There are about 80 nodal points on a human face. A few of the nodal points that are measured by the FACEIT software: distance between eyes; width of nose; depth of eye sockets; cheekbones; Jaw line; and chin. These nodal points are measured to create a numerical code that represents the face in a database. This code is referred to as a faceprint and only fourteen to twenty-two nodal points are necessary for the FACEIT software to complete the recognition process.

Facial recognition methods may vary, but they generally involve a series of steps that serve to capture, analyze and compare your face to a database of stored images. The basic process that is used by the FACEIT software to capture and compare images is set forth below and involves Detection, Alignment, Normalization, Representation, and Matching. To identify someone, facial recognition software compares newly captured images to databases of stored images to see if that person is in the database.

Detection is when the system is attached to a video surveillance system, the recognition software searches the field of view of a video camera for faces. If there is a face in the view, it is detected within a fraction of a second. A multi-scale algorithm is used to search for faces in low resolution. The system switches to a high-resolution search only after a head-like shape is detected.

Alignment is when a face is detected, the system determines the head's position, size and pose. A face needs to be turned at least thirty-five degrees toward the camera for the system to register the face.

Normalization is when the image of the head is scaled and rotated so that the head can be registered and mapped into an appropriate size and pose. Normalization is performed regardless of the head's location and distance from the camera. Light does not impact the normalization process.

Representation is when the system translates the facial data into a unique code. This coding process allows for easier comparison of the newly acquired facial data to stored facial data.

Matching is when the newly acquired facial data is compared to the stored data and linked to at least one stored facial representation.

The heart of the FACEIT facial recognition system is the Local Feature Analysis (LFA) algorithm. This is the mathematical technique the system uses to encode faces. The system maps the face and creates the faceprint. Once the system has stored a faceprint, it can compare it to the thousands or millions of faceprints stored in a database. Each faceprint is stored as an 84-byte file.

One of the first patents related to facial recognition technology is Rothfjell, U.S. Pat. No. 3,805,238 for a Method For Identifying Individuals using Selected Characteristics Body Curves. Rothfjell teaches an identification system in which major features (e.g. the shape of a person's nose in profile) are extracted from an image and stored. The stored features are subsequently retrieved and overlaid on a current image of the person to verify identity.

Another early facial recognition patent is Himmel, U.S. Pat. No. 4,020,463 for an Apparatus And A Method For Storage And Retrieval Of Image Patterns. Himmel discloses digitizing a scanned image into binary data which is then compressed and then a sequence of coordinates and vector values are generated which describe the skeletonized image.

The coordinates and vector values allow for compact storage of the image and facilitate regeneration of the image.

Yet another is Gotanda, U.S. Pat. No. 4,712,103 for a Door Lock Control System. Gotanda teaches, inter alia, storing a digitized facial image in a non-volatile ROM on a key, and retrieving that image for comparison with a current image of the person at the time he/she request access to a secured area. Gotanda describes the use of image compression, by as much as a factor of four, to reduce the amount of data storage capacity needed by the ROM that is located on the key.

Yet another is Lu, U.S. Pat. No. 4,858,000. Lu teaches an image recognition system and method for identifying ones of a predetermined set of individuals, each of whom has a digital representation of his or her face stored in a defined memory space.

Yet another is Tal, U.S. Pat. No. 4,975,969. Tal teaches an image recognition system and method in which ratios of facial parameters (which Tal defines a distances between definable points on facial features such as a nose, mouth, eyebrow etc.) are measured from a facial image and are used to characterize the individual. Tal, like Lu in U.S. Pat. No. 4,858,000, uses a binary image to find facial features.

Yet another is Lu, U.S. Pat. No. 5,031,228. Lu teaches an image recognition system and method for identifying ones of a predetermined set of individuals, each of whom has a digital representation of his or her face stored in a defined memory space. Face identification data for each of the predetermined individuals are also stored in a Universal Face Model block that includes all the individual pattern images or face signatures stored within the individual face library.

Still another is Burt, U.S. Pat. No. 5,053,603. Burt teaches an image recognition system using differences in facial features to distinguish one individual from another. Burt's system uniquely identifies individuals whose facial images and selected facial feature images have been learned by the system. Burt's system also "generically recognizes" humans and thus distinguishes between unknown humans and non-human objects by using a generic body shape template.

Still another is Turk et al., U.S. Pat. No. 5,164,992. Turk teaches the use of an Eigenface methodology for recognizing and identifying members of a television viewing audience. The Turk system is designed to observe a group of people and identify each of the persons in the group to enable demographics to be incorporated in television ratings determinations.

Still another is Deban et al., U.S. Pat. No. 5,386,103. Deban teaches the use of an Eigenface methodology for encoding a reference face and storing said reference face on a card or the like, then retrieving said reference face and reconstructing it or automatically verifying it by comparing it to a second face acquired at the point of verification. Deban teaches the use of this system in providing security for Automatic Teller Machine (ATM) transactions, check cashing, credit card security and secure facility access.

Yet another is Lu et al., U.S. Pat. No. 5,432,864. Lu teaches the use of an Eigenface methodology for encoding a human facial image and storing it on an "escort memory" for later retrieval or automatic verification. Lu teaches a method and apparatus for employing human facial image verification for financial transactions.

Technologies provided by wireless carriers and cellular phone manufacturers enable the transmission of facial or object images between phones using Multimedia Messaging Services (MMS) as well as to the Internet over Email (Simple Mail Transfer Protocol, SMTP) and Wireless Access Protocol (WAP). Examples of digital wireless devices capable of capturing and receiving images and text are camera phones provided by Nokia, Motorola, LG, Ericsson, and others. Such phones are capable of handling images as JPEGs over MMS, Email, and WAP across many of the wireless carriers: Cingular, T-Mobile, (GSM/GPRS), and Verizon (CDMA) and others.

Neven, U.S. Patent Publication 2005/0185060, for an Image Base Inquiry system For Search Engines For Mobile Telephones With Integrated Camera, discloses a system using a mobile telephone digital camera to send an image to a server that converts the image into symbolic information, such as plain text, and furnishes the user links associated with the image which are provided by search engines.

Neven, et al., U.S. Patent Publication 2006/0012677, for an Image Based Search Engine For Mobile Phones With Camera, discloses a system that transmits an image of an object to a remote server which generates three confidence values and then only generates a recognition output from the three confidence values, with nothing more.

Adam et al., U.S. Patent Publication 2006/0050933, for a Single Image Based Multi-Biometric System And Method which integrates face, skin and iris recognition to provide a biometric system.

Until recently, acquiring information about someone from a real-time image has always been the domain of science fiction novels. Recently, the government and large companies (such as casinos) have implemented face recognition systems to identify individuals from a real-time image. However, do to the costs and lack of a database these systems are not available to the individual member of the general public. Further, the present systems rely on the individual being present geographically and an image of the individual being provided on a predetermined database such as government database of images of terrorists or a casino database of images of known "card cheaters."

BRIEF SUMMARY OF THE INVENTION

The present invention provides a novel method and system for providing individuals of the general public an expedient, inexpensive and technologically easy means for acquiring information about an individual from an image, and acquiring information about an individual that is not geographically present from an image.

The invention preferably uses a digital image captured by a wireless communication device (preferably a mobile telephone) or from a personal computer (PC). The image may be in a JPEG, TIFF, GIF or other standard image format. Further, an analog image may be utilized if digitized. An example is the image is sent to the application and can be viewed by the user either through their wireless communication device or through a Web site. The image is sent to the wireless carrier and subsequently sent over the Internet to an image classification server. Alternatively, the digital image may be uploaded to a PC from a digital camera or scanner and then sent to the image classification server over the internet.

After an image is received by the image classification server, the image is processed into a feature vector, which reduces the complexity of the digital image data into a small set of variables that represent the features of the image that are of interest for classification purposes.

The feature vector is compared against existing feature vectors in an image database to find the closest match. The image database preferably contains one or more feature vectors for each target individual.

Once classified, an image of the best matching person, possibly manipulated to emphasize matching characteristics, as well as meta-data associated with the person, sponsored information, similar product, inventory or advertisement is sent back to the user's PC or wireless communication device.

A more detailed explanation of a preferred method of the invention is as follows below. The user captures a digital image with a digital camera enabled wireless communication device, such as a mobile telephone. The compressed digital image is sent to the wireless carrier as a multimedia message (MMS), a short message service ("SMS"), an e-mail (Simple Mail Transfer Protocol ("SMTP")), or wireless application protocol ("WAP") upload. The image is subsequently sent over the internet using HTTP or e-mail to an image classification server. Alternatively, the digital image may be uploaded to a PC from a digital camera, or scanner. Once on the PC, the image can be transferred over the Internet to the image classification server as an e-mail attachment, or HTTP upload. The user is preferably the provider of the digital image for classification, and includes, but is not limited to a physical person, machine, or software application.

After the image is received by the image classification server, a feature vector is generated for the image. A feature vector is a small set of variables that represent the features of the image that are of interest for classification purposes. Creation and comparison of features vectors may be queued, and scaled across multiple machines. Alternatively, different feature vectors may be generated for the same image. Alternatively, the feature vectors of several images of the same individual may be combined into a single feature vector. The incoming image, as well as associate features vectors, may be stored for later processing, or added to the image database. For faces, possible feature vector variables are the distance between the eyes, the distance between the center of the eyes, to the chin, the size, and shape of the eyebrows, the hair color, eye color, facial hair if any, and the like.

After the feature vector for an image is created, the feature vector is compared against feature vectors in an image database to find the closest match. Preferably, each image in the image database has a feature vector. Alternatively, feature vectors for the image database are created from a set of faces, typically eight or more digital images at slightly different angles for each individual. Since the target individual's feature vector may be generated from several images, an optional second pass is made to find which of the individual images that were used to create the feature vector for the object best match the incoming image.

Once classified, the matching image's name and associated meta-data is retrieved from the database. The matching image's name, meta-data, associated image, and a copy of the incoming image are then sent back to the user's wireless communication device or PC, and also to a Web page for the user.

One aspect of the present invention is a method of identifying an unknown individual from a digital image. The method includes acquiring an unknown facial image of an individual. The method also includes transmitting the unknown facial image from a sender over a network to a server. The method also includes analyzing the facial image at the server to determine if the unknown facial image is acceptable. The method also includes processing the unknown facial image to create a processed image. The method also includes comparing the processed image to a plurality of database processed images. The method also includes matching the processed image to a database processed image of the plurality of database processed images to create matched images. The database processed image is a facial image of the individual from the individual's Web page of a Web site. The Web page contains personal information of the individual and a uniform resource locator for the Web page. The method also includes transmitting the database processed image, the personal information of the individual and the uniform resource locator for the Web page to the sender over the network.

The Web site is preferably a publicly available website selected from the group of LinkedIn®, Hi5®, Friendster®, iGoogle®, Netlog®, Orkut®, Facebook®, and MySpace®. However, the Web site alternatively is a private Web site such as a company's intranet Web site.

The personal information of the individual preferably comprises the individual's name, address, telephone number, email address, age, school, friends, favorite entertainments and/or favorite foods. Acquiring an unknown facial image of an individual using the method preferably comprises photographing the individual with a camera phone.

The processed image is preferably processed as a primary feature vector and the plurality of database processed images is a plurality of database feature vectors. Comparing the processed image to a plurality of database processed images preferably comprises comparing the primary feature vector to each of the plurality of database feature vectors. The primary feature vector and each of the plurality of database feature vectors are preferably based on a plurality of factors comprising facial expression, hair style, hair color, facial pose, eye color, local feature analysis, eigenfaces, principle component analysis, texture of the face, color of the face and facial hair.

The method preferably further comprises web crawling a plurality of Web sites for images of individuals to process each of the images to add to the databases of processed images with each of the images of the databases of processed images having a tag for linking to the Web site pertaining to the image.

Another aspect of the present invention is a method of networking. The method includes identifying a first photograph or first video with images of a plurality of primary individuals. The method also includes generating a plurality of feature vectors for each of the primary individuals of the plurality of primary individuals. The method also includes determining an entity to create a network of contact individuals to link to the entity from a main primary individual of the plurality of primary individuals. The method also includes searching a plurality of Web sites comprising a plurality of digital images or digital videos of secondary individuals and primary individuals. The method also includes identifying a digital image or digital video of secondary individuals and primary individuals containing at least one primary individual of the plurality of primary individuals based on the plurality of feature vectors for the at least one individual. The method also includes generating a link from the at least one primary individual of the plurality of primary individuals to the at least one secondary individual of the plurality of secondary individuals. The method also includes generating a plurality of feature vectors for the at least one secondary individual of the plurality of secondary individuals. The method also includes searching the plurality of Web sites for a digital image or digital video of the at least one secondary individual and at least one of a plurality of tertiary individuals. The method also includes creating a link from the main primary individual of the plurality of primary individuals to the at least one primary individual of the plurality of primary individuals to the at least one secondary individual to plurality of tertiary individuals to the entity by searching the plurality of Web sites for images of a previously identified individual based on the generation of a plurality of feature vectors for the previously identified individual and then linking that previously identified individual to a subsequent individual to form the link.

The entity is preferably the president of a corporation, an investor, a possible future spouse or a company. The main primary individual preferably only knows the plurality of primary individuals, and the plurality of secondary individuals and plurality of tertiary individuals are all strangers to the main primary individual. The link from the main individual to the entity preferably comprises at least five individuals.

Yet another aspect of the present invention is a method of identifying an unknown individual from a digital image. The method includes acquiring an unknown image of an individual. The method also includes transmitting the unknown image from a sender over a network to a server. The method also includes processing the unknown image to create a plurality of feature vectors corresponding to the unknown image. The method also includes searching a plurality of Web sites to locate an image on a Web site of the plurality of Web sites that matches the plurality of feature vectors of the unknown image. The method also includes transmitting the image from the website of the plurality of Web sites and the uniform resource locator for the Web site of the plurality of Web sites to the sender over the network.

Yet another aspect of the present invention is a method for determining unwanted individuals on a social networking Web site. The method includes generating a plurality of feature vectors for an image for each unwanted individual from a plurality of images of unwanted individuals. The method also includes analyzing a plurality of images on a social networking Web site to locate an image that matches the plurality of feature vectors for an image of an unwanted individual from the plurality of images of unwanted individuals. The method also includes matching an image on the social networking Web site to the plurality of feature vectors for an image of an unwanted individual from the plurality of images of unwanted individuals.

The method also preferably further includes transmitting a message to an operator of the social networking Web site that an unwanted individual has an image on the social networking Web site.

The unwanted individuals are preferably sexual predators, or the images are a plurality of mug shots from a law enforcement Web site or database.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
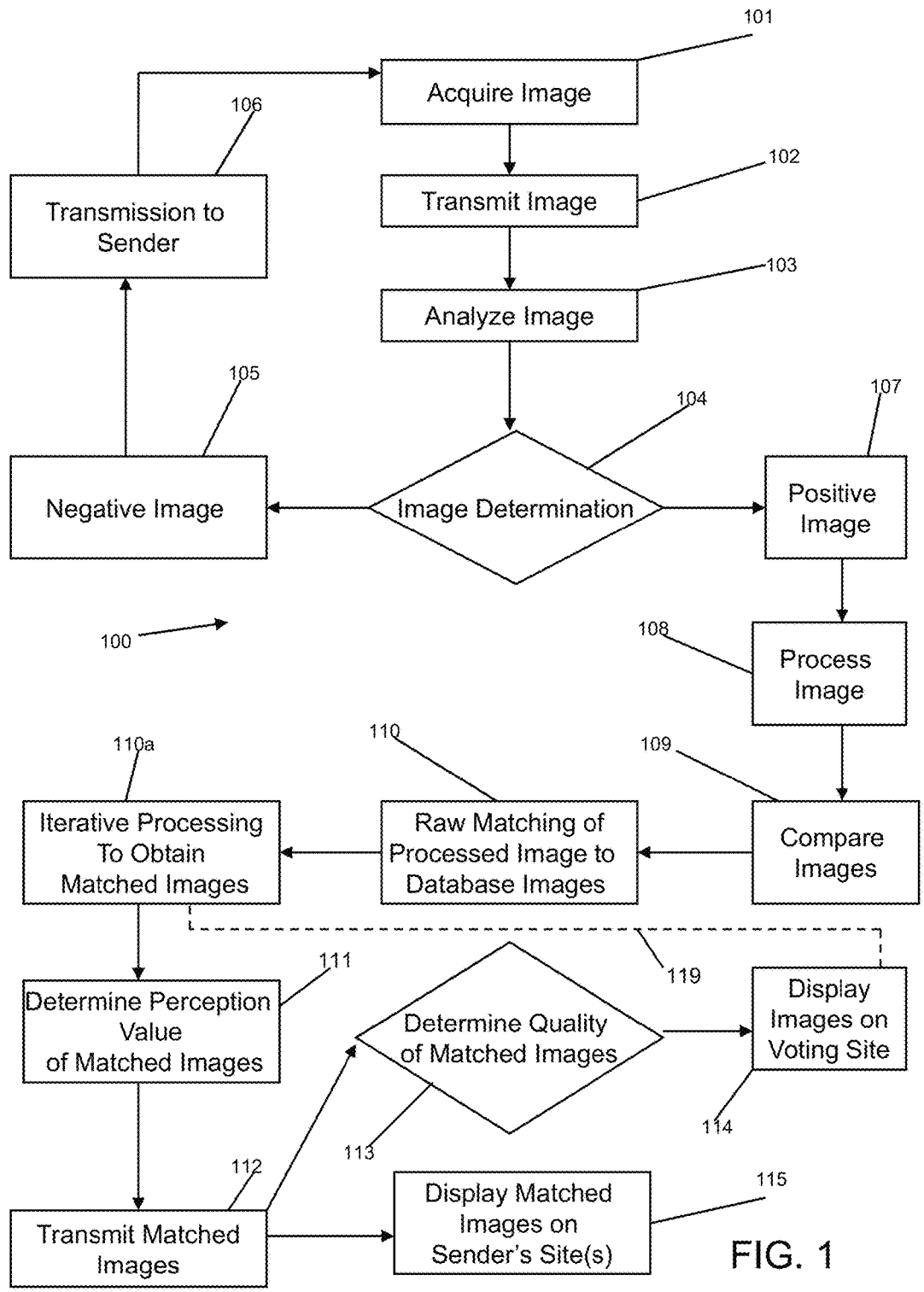
FIG. 1 is a flow chart of a specific method of the present invention.

A flow chart of a preferred specific method of the present invention is illustrated in FIG. 1. The method is generally designated 100 and commences with a facial image of individual being acquired at block 101. The facial image is acquired preferably using a digital camera of a wireless communication device such as a wireless mobile telephone, personal digital assistant ("PDA") or the like. Alternatively, the facial image is acquired from a PC or the like. In one possible scenario, an individual is in public and sees another individual. The first individual is attracted to the other individual and clandestinely photographs the second individual with a camera phone thereby acquiring a facial image of the second individual. The first individual hopes to collect additional information about the second individual using the present invention.

At block 102, the facial image is transmitted over a network to an image classification server, preferably over a wireless network. The facial image is preferably sent to a male or female designation site at the image classification server. The facial image is subsequently sent over the internet using HTTP or e-mail to the image classification server. The facial image, preferably a compressed digital facial image such as a JPEG image, is sent to a wireless carrier as a MMS, a SMS, a SMTP, or WAP upload. Alternatively, the facial image is uploaded to a PC from a digital camera, or scanner and then transferred over the internet to the image classification server as an e-mail attachment, or HTTP upload.

At block 103, the facial image is analyzed at the image classifications server to determine if the facial image is of adequate quality to be processed for matching. Quality issues with the facial image include but are not limited to a poor pose angle, brightness, shading, eyes closed, sunglasses worn, obscured facial features, or the like. At block 104, an image determination is made concerning the quality of the image. A negative image determination is made at block 105. At block 106, a transmission is sent to the sender informing then sender that the facial image provided is inadequate and requesting that the sender provide a new facial image. The matching procedure for such a negative image may continue, and the matched images will be sent with an additional statement informing the sender that the image was of bad quality and that a better match may be possible with a higher quality image.

At block 107, if the facial image is positive, then the facial image is processed at block 108. At block 108, processing of the image preferably comprises using an algorithm which includes a principle component analysis technique to process the face of the facial image into an average of a multitude of faces, otherwise known as the principle component and a set of images that are the variance from the average face image known as the additional components. Each is reconstructed by multiplying the principal components and the additional components against a feature vector and adding the resulting images together. The resulting image reconstructs the original face of the facial image. Processing of the facial image comprises factors such as facial hair, hair style, facial expression, the presence of accessories such as sunglasses, hair color, eye color, and the like. Essentially a primary feature vector is created for the facial image.

At block 109, processed image or primary feature vector is compared to a plurality of database processed images preferably located at the image classification server. During the comparison, the primary feature vector is compared a plurality of database feature vectors which represent the plurality of database processed images. The database preferably includes at least 100,000s of processed images, more preferably at least 1,000,000 processed images, and most preferably from 100,000 processed images to 10,000,000 processed images. Those skilled in the pertinent art will recognize that the database may contain any number of images without departing from the scope and spirit of the present invention. The processed images preferably include multiple images of one individual, typically from two to twenty images, more preferably from four to ten images of a single individual in different poses, different facial expressions, different hair styles and the like. The database of processed images preferably includes images acquired from social networking Web sites, other publicly accessible Web sites, private Web sites, and government Web sites. These images are preferably obtained working with the owners of the Web site or using a Web crawling or spider program to obtain images and information for processing into feature vectors.

At block 110, the processed image undergoes raw matching of a small plurality of database images with each having a feature vector value that is close to the value of the primary feature vector. At block 110a, the iterative processing of the raw matching is performed wherein the human perception of what is a good match is one of the primary factors in creating the matched images. At block 111, preferably a perception value for the matched images is determined based on the feature vector values. The perception value ranges from 0% to 100%, with 100% being an ideal match. At block 111a, the matches are sorted based on predicted human perception.

At block 112, preferably the matched images and information about the individual are transmitted to the sender over a network as discussed above for the initial transmission. The entire process preferably occurs within a time period of sixty seconds, and most preferably within a time of ten seconds. The process may be delayed due to the wireless carrier, and network carrier. In this manner, the sender will know which celebrity the facial image best matches. The output of the matched images and any additional text is preferably sent to the sender's wireless communication device for instantaneous feedback of their inquiry of which celebrity does the facial image look like. Further, the output is also sent to a sender's Web page on a Web site hosted through the image classification server wherein the sender can control access to the sender's web page and modify the matched images and the additional text.

At decision 113, the quality of the matched images is determined to decide if the matched images should be sent to voting site on the web site. At block 115, the matched images are preferably sent to the sender's wireless communication device, the sender's Web page on the Web site for viewing by the sender and other viewers determined by the sender. At block 114, the matched images are sent to a quality verification site.

In this manner, a statistical modeling element is added to the matching process to better match images based on human perception as determined by the scores for previously matched images on the voting site. In other embodiments regression analysis or Bayesian analysis is utilized. Under this alternative scenario, a Support Vector Machine, preferably a high-dimensional neural network, with two feature vectors of a match, along with average vote scores collected from viewers of the web site will be utilized to provide better matching of images. A more detailed explanation of a Support Vector Machine is set forth in Cortes & Vapnik, *Support Vector Networks, Machine Learning*, 20, 1995, which is hereby incorporated by reference in its entirety. The previous voting patterns are implemented in a statistical model for the algorithm to capture the human perception element to better match images as perceived by humans.

Figure 2:
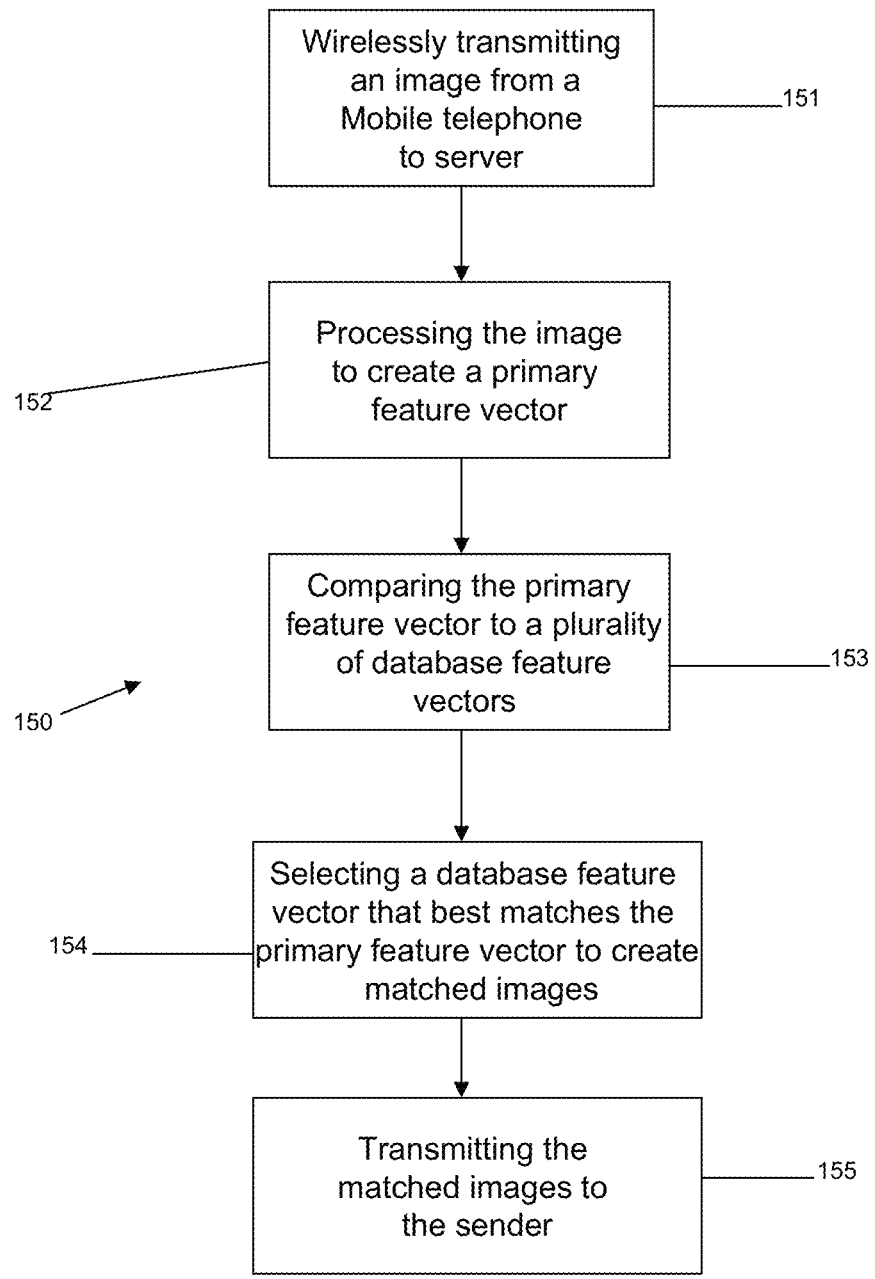
FIG. 2 is a flow chart of a general method of the present invention.

A more general method of the present invention is illustrated in FIG. 2. The general method is designated 150. At block 151, an unknown image from a wireless communication device such as a mobile telephone is transmitted from a sender to an image classification server over a network such as a wireless network with subsequent internet transmission. At block 152, the unknown image is processed to create a primary feature vector such as discussed above. At block 153, the primary feature vector value is compared to a plurality of database feature vectors. At block 154, a database feature vector that best matches the primary feature vector is selected to create matched images. At block 155, the matched images are transmitted to the sender, along with a confidence value and other information about the matching image.

Figure 3:
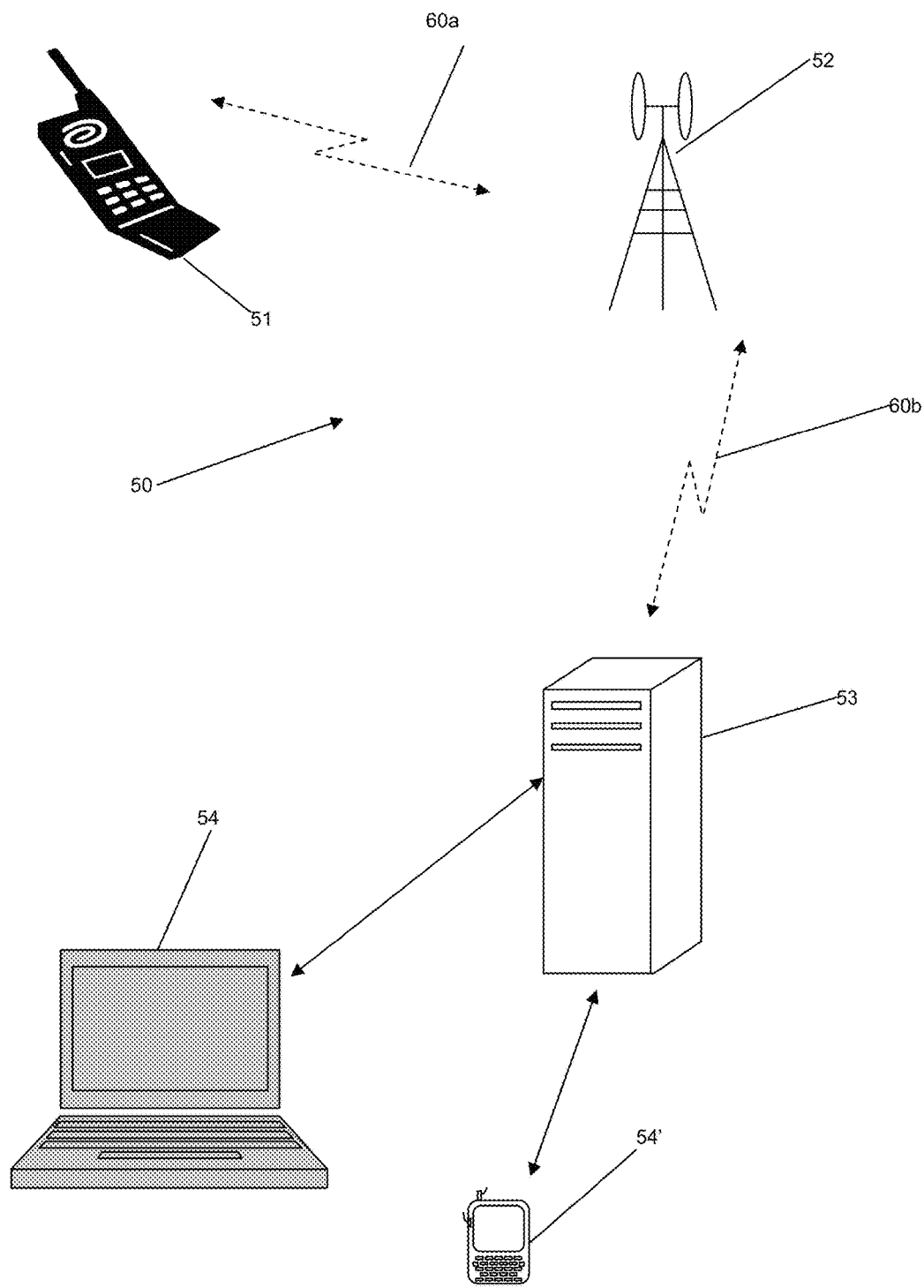
FIG. 3 is a schematic diagram of a system of the present invention.

A system of the present invention is illustrated in FIG. 3. The system is generally designated 50. The system 50 preferably comprises a wireless communication device 51, a wireless network 52, an image classification server 53 and a web site 55, not shown, which may be viewed on a computer 54 or alternate wireless communication device 54' with internet access. The wireless communication device preferably comprises means for generating a digital facial image of an individual and means for wirelessly transmitting the digital facial image over a wireless network. The image classification server 53 preferably comprises means for analyzing the digital facial image, means for processing the digital facial image to generate a processed image, means for comparing the processed image to a plurality of database processed images, means for matching the processed image to a database processed image to create matched images, means for determining a perception value, means for applying a statistical model based on human perception as determined by user's votes of previous third party matched images, and means for transmitting the matched images and information to the wireless communication device.

The present invention preferably uses facial recognition software commercially or publicly available such as the FACEIT brand software from IDENTIX, the FACEVACS brand software from COGNETIC, and others. Those skilled in the pertinent art will recognize that there are many facial recognition softwares, including those in the public domain, that may be used without departing from the scope and spirit of the present invention.

Figure 3A:
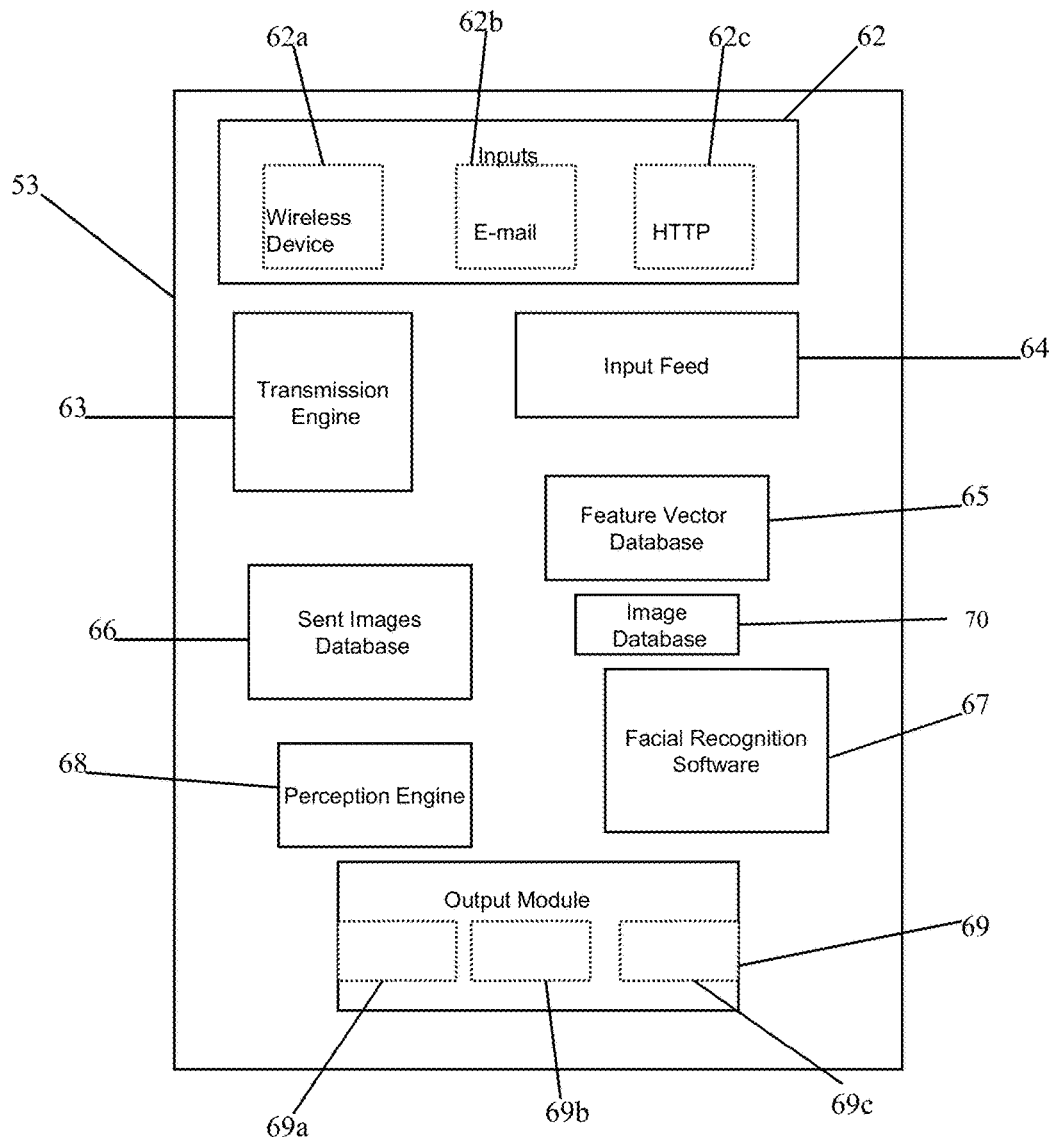
FIG. 3A is a schematic representation of the image classification server of the present invention.

The operational components of the image classification server 53 are schematically shown in FIG. 3A. The image classification server 53 preferably comprises an input module 62, transmission engine 63, input feed 64, feature vector database 65, sent images database 66, facial recognition software 67, perception engine 68, output module 69 and the image database 70. The input module 62 is further partitioned into wireless device inputs 62*a*, e-mail inputs 62*b* and HTTP (internet) inputs 62*c*. The output module 69 is further partitioned into wireless device outputs 69*a*, a sender's web page output 69*b* and a voting web page output 69*c*. The feature vector database 65 is the database of processed images of the celebrities from which the previously unknown facial image is matched with one of the processed images. The image database is a database of the actual images from social networking Web sites, other publicly accessible Web sites, private Web sites, and government Web sites which are sent as outputs for the matched images. The sent images database 66 is a database of all of the images sent in from users/senders to be matched with the processed images. The perception engine 68 imparts the human perception processing to the matching procedure.

Figure 4:
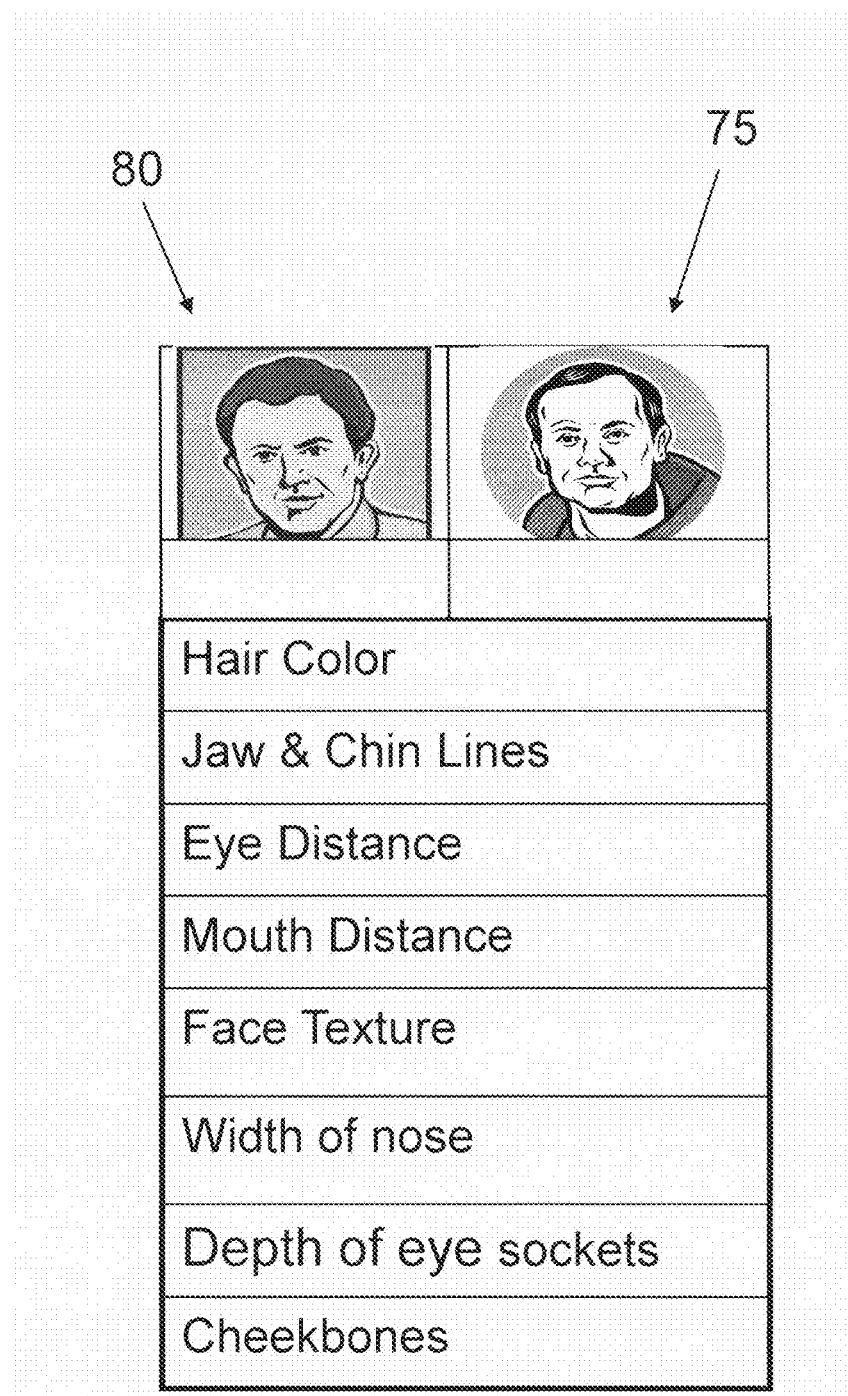
FIG. 4 is image and table comparison of an unknown image and a celebrity image.

As shown in FIG. 4, an unknown facial image 80 sent by an individual is matched to a image 75 selected from the database of processed images using a method of the present invention as set forth above. The table provides a comparison of the facial values for each of the images.

The present invention also preferably uses voting results to weigh feature vectors. In addition to using vote results to select which actor images are good for enrollment, vote results can also be used to weigh the feature vector itself so that qualities of the image that are perceived by humans are more heavily weighted when searching for a good match. Biometric security software (Cognitec, Identix, etc.) selects and weighs the features of an image in order to match an image of a person to another image of the same person and optimizing the vector to achieve this result. The feature vector can be made up of local facial features, or overall components of the face as determined by principle component analysis.

The use of human perception voting results in order to optimize the look-a-likeness of a person to a different person can use used, regardless of the how the feature vectors are determined. In other words, the algorithm for determining the set of feature vectors that best represent a face can be augmented with a $2^{nd}$ algorithm which takes these feature vectors, typically represented as a vector of floating point numbers, and weighs the values in the vector so that the characteristics of the image that are based on human perception are used more heavily. A more detailed explanation of human perception for facial recognition is provided in Myers, et al., U.S. patent application Ser. No. 12/138,559, filed on Jun. 13, 2008, for Image Classification And Information Retrieval Over Wireless Digital Networks And The Internet, which is hereby incorporated by references in its entirety.

Statistical methods such as neural networks or support vector machines (SVMs) can be used to feed the source and actor feature vectors and predict the human perception vote.

The feature vector from the source image and the feature vector from the actor image are feed into a neural network which is trained on the human perception rating for the match. Given many matches and corresponding votes, the neural network can weigh the input vector values, v1, v2, etc. and see which of these feature vector components are statistically relevant to the determination of the human vote or rating.

Once trained, the Neural Network or SVM can predict whether a match is good or not by using the feature vectors, determined from a separate algorithm.

Figure 5:
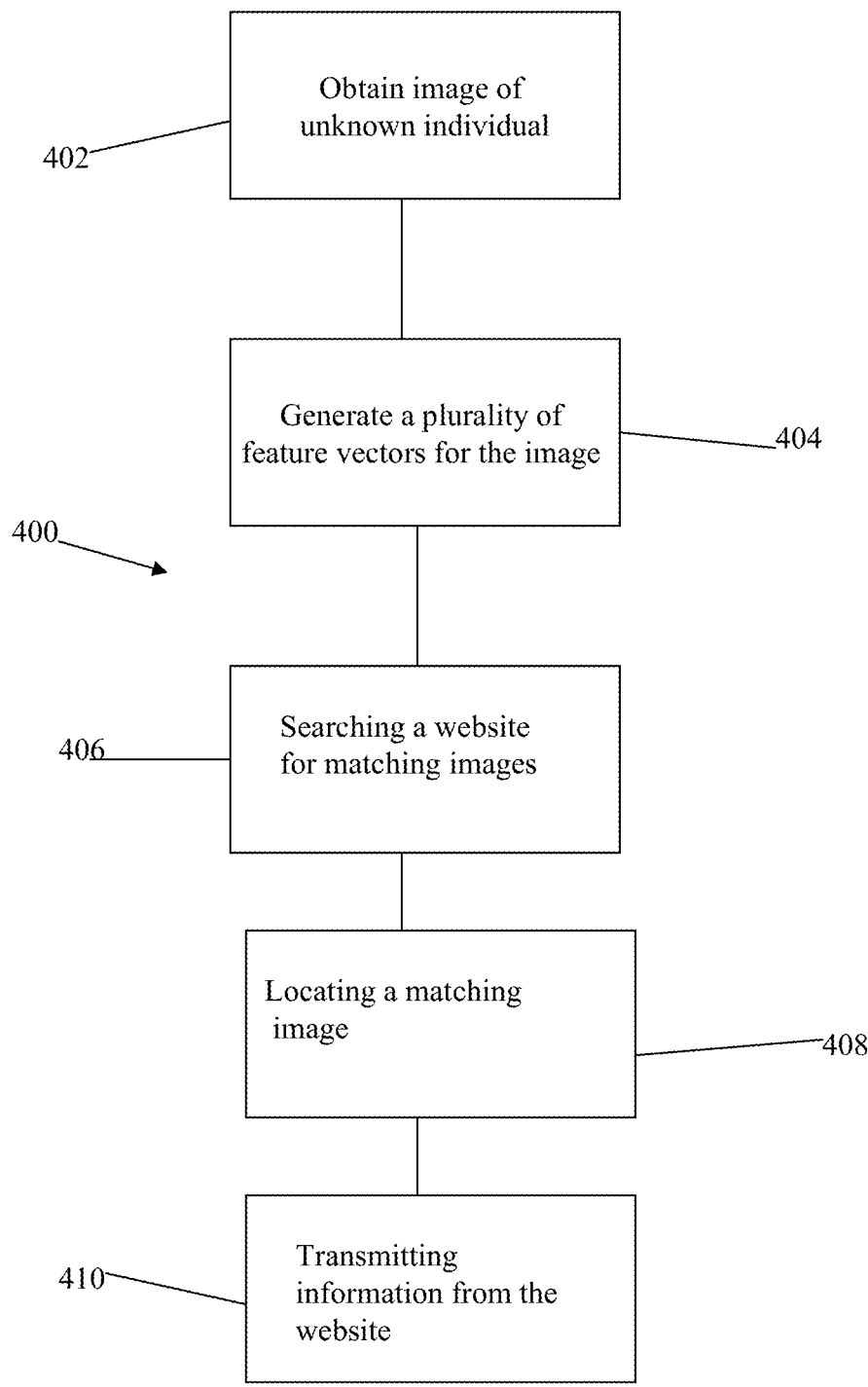
FIG. 5 is a flow chart of a specific method of the present invention.

A method 400 for determining the name of an unknown person is shown in FIG. 5. In this method, at block 402, a person acquires an image of another unknown person because the person wants to meet the unknown person. The first person may take a digital image of the unknown person using, for example, a camera phone on a mobile telephone. At block 404, the image is then sent to a server as discussed above in reference to FIG. 1, where a plurality of feature vectors are generated for the image of the unknown person. At block 406, the server searches publicly accessible websites, such as myspace.com facebook.com, and other social networking websites, to find a match. A Web crawler (or Web spider) program is preferably used to search the Web sites. A Web crawler is capable of browsing the Web automatically to gather information, and specifically as pertains to this invention, to gather images for processing into feature vectors for analysis. The accessible images on the social networking Web site are processed into feature vectors for comparison with requested images. At block 408, a match is located and information from the website for the unknown individual is captured. Such information may be a URL for the Web page of the unknown person, personal information, and other available information. At block 410, the information is transmitted to the first person.

Figure 6:
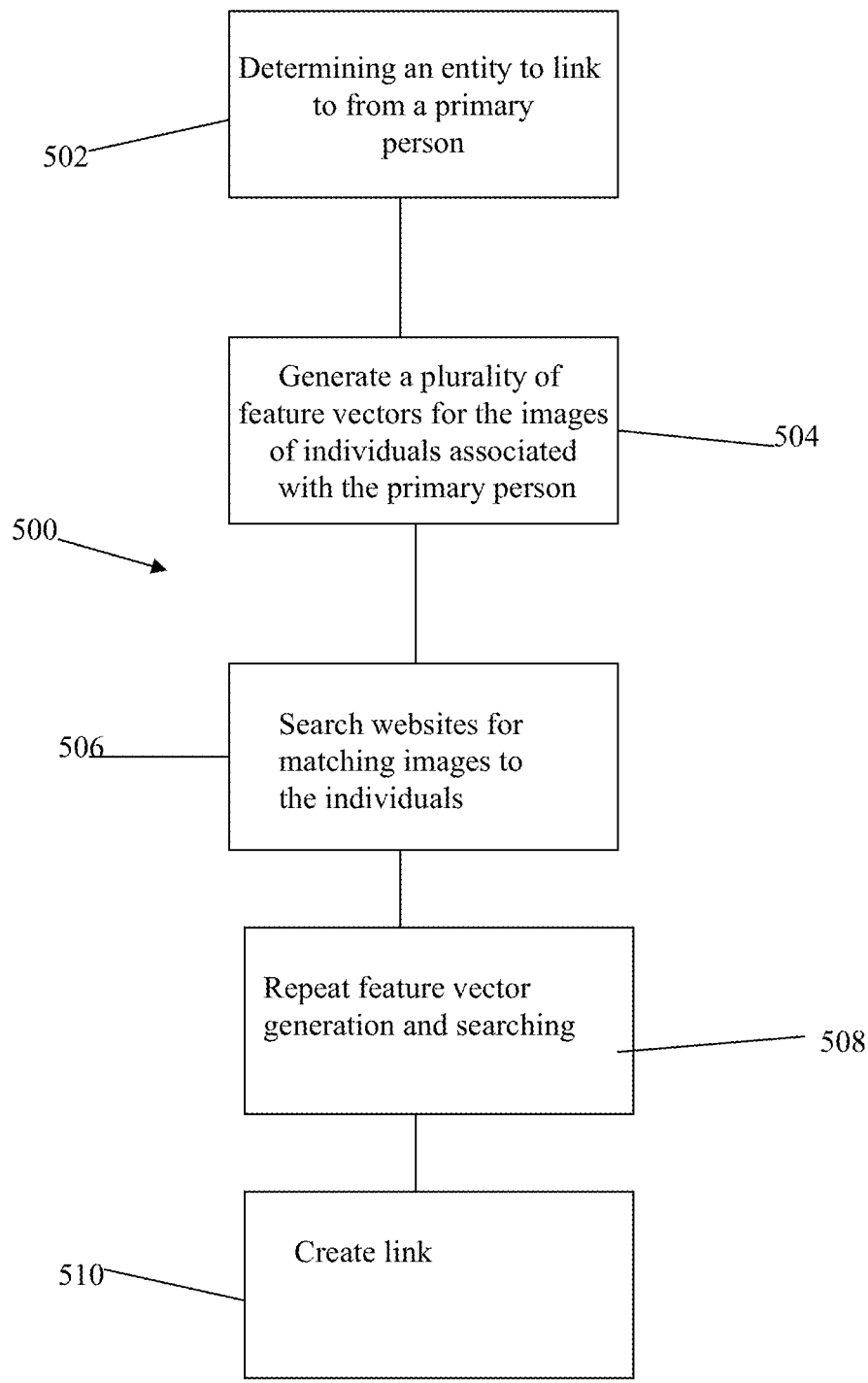
FIG. 6 is a flow chart of a specific method of the present invention.

A method 500 for creating a link from a main primary person to an entity, such as a president of a corporation, is shown in FIG. 6. For example, a person may want to create a social or professional network link to a desired person or company. The present method allows that person to create that link using images on publicly accessible Web sites to create such a link. At block 502, the endpoints of the link are determined. At block 504, the person takes an image or images of a plurality of friends, transfers the images to a server, and generates a plurality of feature vectors for each image as discussed in reference to FIG. 1. At block 506, the server searches Web sites matching the images to other images and then creating new feature vectors for persons in a photograph with the previously identified person. A Web crawler (or Web spider) program is preferably used to search the Web sites. A Web crawler is capable of browsing the Web automatically to gather information, and specifically as pertains to this invention, to gather images for processing into feature vectors for analysis. The accessible images on the social networking Web site are processed into feature vectors for comparison with requested images. For example, the main person has digital photos of his or her friends. The server, after creating feature vectors for the images, searches for other images of those friends, and persons associated with those friends. Those associated persons may just be in a photo with the friend. The server creates feature vectors for these associated persons' images, at block 508, and then searches again until a link is created to the entity, a block 510. The server may also begin at the destination/entity and search backward toward the person.

Figure 7:
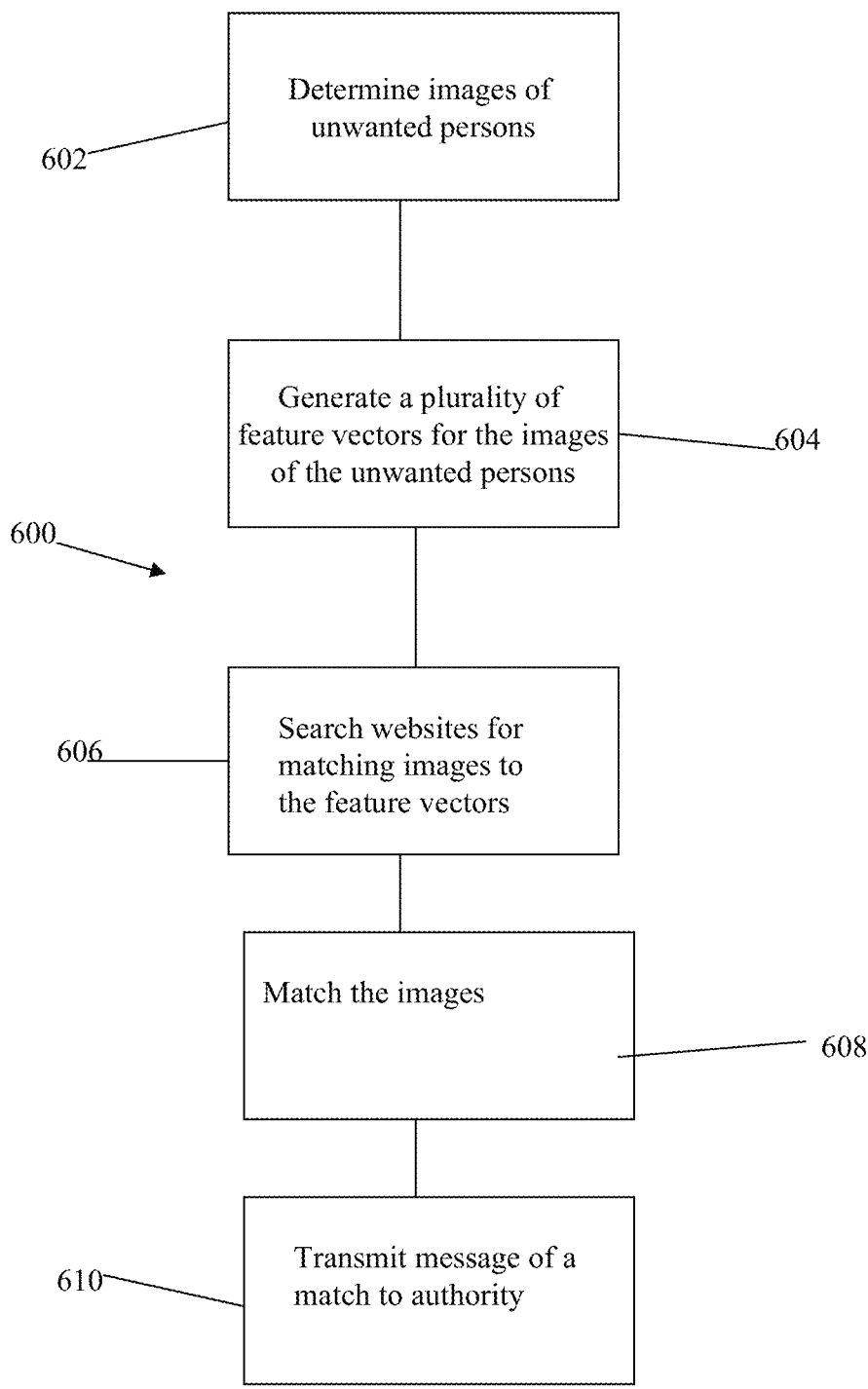
FIG. 7 is a flow chart of a specific method of the present invention.

A method 600 for finding unwanted persons having Web pages on a social networking Web site is illustrated in FIG. 7. At block 602, images of unwanted persons are designated. These images may be from law enforcement, sexual predator websites, or the like. At block 604, a server generates a plurality of feature vectors for each image as discussed in reference to FIG. 1. At block 606, social networking Web sites are searched for matching images. A Web crawler (or Web spider) program is preferably used to search the Web sites. A Web crawler is capable of browsing the Web automatically to gather information, and specifically as pertains to this invention, to gather images for processing into feature vectors for analysis. The accessible images on the social networking Web site are processed into feature vectors for comparison with requested images. At block 608, a match is found. At block 610, a message is sent to an operator of the Web site to inform them that an unwanted person has an image on their Web site. Such a method may be used to locate sexual predators that have Web pages on social networking sites.

Figure 8:
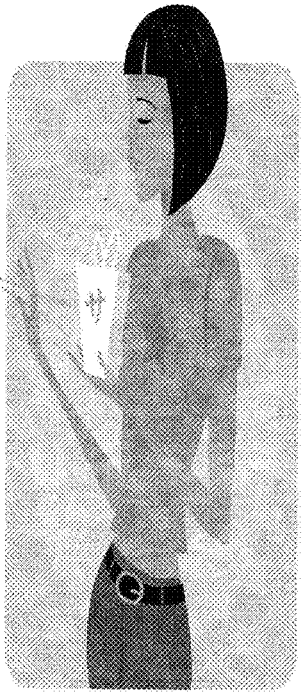
FIG. 8 is an image of a Web page of a user of a social network.
Figure 8:
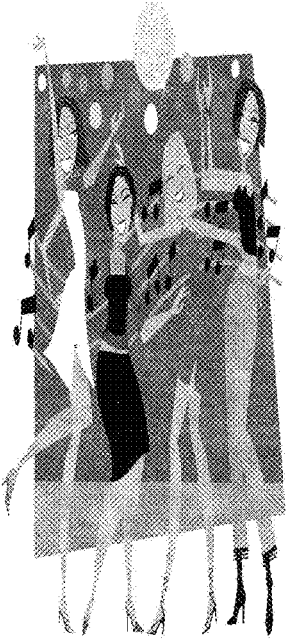

FIG. 8 is an image 700 of an individual's Web page on a social networking Web site. The individual, Jessica, includes a photo with an image of herself and a photo of friends. The Web page also contains personal information like an email address, age, likes and dislikes and more. The present invention preferably web crawls, scrapes or otherwise collects the image(s) from this Web page along with the URL for the Web page. The image(s) are processed at the image classification server and added to the database of processed images. When an individual that does not know Jessica acquires a digital image of Jessica, the present invention allows that individual to eventually find this Web page and obtain information about Jessica so that the individual may contact Jessica.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A system for utilizing facial recognition technology for identifying an unknown individual, the system comprising:
   receiving at a server, from a camera, a digital unknown facial image of an individual;
   analyzing, at the server, the unknown facial image to determine if the unknown facial image is of adequate quality prior to image recognition processing of the unknown facial image, wherein, adequate quality is determined by a plurality of facial image factors comprising eyes closed, brightness of the facial image, shading of the facial image, pose angle of the facial image, and obscured facial features of the facial image;
   wherein, when the unknown facial image is not of adequate quality, comparing, at the server, a primary feature vector to a plurality of database processed images comprising a plurality of database feature vectors; matching, at the server, the primary feature vector to a database primary feature of the plurality of database feature vectors to create matched images; and sending, at the
   server, information associated with the matched images indicating that a better matched image may be possible with a higher quality digital unknown facial image; and
   when the unknown facial image is of adequate quality, processing, at the server, the
   unknown facial image to create a processed image, wherein the processed image comprising a
   primary feature vector, wherein the primary feature vector of the processed image is determined by a plurality of facial image factors comprising eyes closed, brightness of the facial image, shading of the facial image, pose angle of the facial image, and obscured facial features of the facial image; comparing, at the
   server, the primary feature vector of the processed image to a plurality of database processed images comprising a plurality of database feature vectors; and matching, at the server, the primary feature vector of the processed image to a database primary feature vector of the plurality of database feature vectors to create matched images.

2. The system according to claim 1 wherein the database processed image includes a facial image of an individual from a Web page of a Web site, the Web page containing personal information of the individual.

3. The system according to claim 2 wherein the Web page further includes a uniform resource locator for the Web page.

4. The system according to claim 3 further comprising transmitting, from the server, the database processed image, the personal information of the individual, and the uniform resource locator for the Web page over the network.

5. The system according to claim 1 wherein the processing, at the server, the unknown facial image to create a processed image only occurs if at least two or more facial image factors are of adequate quality.

6. The system according to claim 1 further comprising:
   when the unknown facial image is not of adequate quality, receiving, at the server, a second digital unknown facial image of an individual to analyze.

7. A system for utilizing facial recognition technology for identifying an unknown individual, the system comprising:
   receiving at a server, from a camera, a digital unknown facial image of an individual;
   analyzing, at the server, the unknown facial image to determine if the unknown facial image is of adequate quality prior to image recognition processing of the unknown facial image, wherein, adequate quality is determined by a plurality of facial image factors comprising eyes closed, brightness of the facial image, shading of the facial image, pose angle of the facial image, and obscured facial features of the facial image;
   determining, at the server, whether the unknown facial image is or is not of adequate quality,
   wherein, in response to determining that the unknown facial image is not of adequate
   quality, comparing, at the server, the primary feature vector to a plurality of database processed images comprising a plurality of database feature vectors; matching, at the server, a primary feature vector to a database primary feature of the plurality of database feature vectors to create
   matched images; and sending, at the server, information associated with the matched images indicating that a better matched image may be possible with a higher quality digital unknown facial image; and
   in response to determining that the unknown facial image is of adequate quality,
   processing, at the server, the unknown facial image to create a processed image
   comprising a primary feature vector,
      wherein the primary feature vector of the processed image is determined by a plurality of facial image factors comprising eyes closed, brightness of the facial image, shading of the facial image, pose angle of the facial image, and obscured facial features of the facial image;
   comparing, at the server, the primary feature vector of the processed image to a plurality of database processed images comprising a plurality of database feature vectors; and matching, at the server, the primary feature vector of the processed image to a database primary feature vector of the plurality of database feature vectors to create matched images.

8. The system according to claim 7 further comprising: in response to determining that the unknown facial image is not of adequate quality, requesting, from the server, a second digital unknown facial image of an individual to analyze.

9. The system according to claim 2 wherein the Web site is a publicly available Web site.

10. The system according to claim 2 wherein the personal information of the individual comprises the individual's name, address, telephone number, email address, age, school, friends, favorite entertainments and/or favorite foods.

11. The system according to claim 1 wherein the camera is a camera phone.

12. The system according to claim 1 further comprising crawling a plurality of Web sites for images of individuals to process each of the images to add to the databases of processed images, each of the images of the databases of processed images having a tag for linking to the Web site pertaining to the image.

13. The system according to claim 7 wherein the visibility of facial features around the eyes of the facial image is a grouping of facial image factors that include at least one of: eyes closed, sunglasses worn, distance between the eyes, distance between the center of the eyes to the chin, size and shape of eyebrows, and eye color.

14. The system according to claim 7 wherein the visibility of other facial features of the facial image is a grouping of facial image factors that include at least one of: brightness, shading, obscured facial features, facial expression, hair style, and hair color.

15. The system according to claim 1 wherein the plurality of facial image factors include at least one of: sunglasses worn, distance between the eyes, distance between the center of the eyes to the chin, size and shape of eyebrows, and eye color.

16. The system according to claim 1 wherein obscured facial features of the facial image is a grouping of facial image factors that include at least one of: brightness, shading, obscured facial features, facial expression, hair style, and hair color.

* * * * *